Oct. 20, 1970 R. B. PULESTON 3,534,968

ELLIPTICAL PHONOGRAPH STYLUS

Filed Feb. 6, 1969

INVENTOR
ROBERT B. PULESTON

BY *Wilfred G. Caldwell*
ATTORNEY

United States Patent Office 3,534,968

Patented Oct. 20, 1970

3,534,968

ELLIPTICAL PHONOGRAPH STYLUS

Robert B. Puleston, Barrington, R.I., assignor to Bruce Diamond Corporation, Attleboro, Mass., a corporation of Massachusetts Filed Feb. 6, 1969, Ser. No. 797,190
Int. Cl. G11b *3/44*
U.S. Cl. 274—38 3 Claims

ABSTRACT OF THE DISCLOSURE

The present invention relates to a novel mounted or unmounted phonograph stylus of elliptical cross-section, with the groove contacting edges having the same identical radii throughout, at least, the vertical operative length, such that greater tilt error (laterally of the groove) may be accommodated without impairing the fidelity of reproduction. There is maintained a constant radius, of preferably 0.0002 inch, at any point where the stylus contacts the sides of the record groove walls, whereas in prior art styli, the radius grows rapidly vertically along the stylus, usually even before the points of contact with the record are reached, and necessarily increases far beyond the preferred constant radius. Certainly one of the greatest problems affecting the stylus function is the deletereous effects encountered as a result of tilt error, which error is inherent in most installations and may increase with the handling and use. Thus, this invention compensates for inherent inaccuracies of the stylus beam system.

Figure 1:
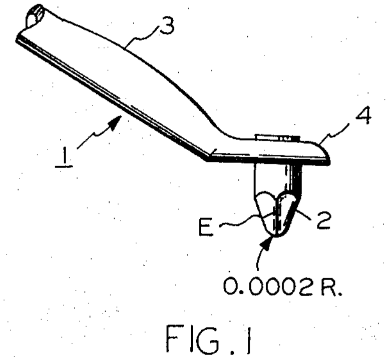

The present invention relates broadly to the art of audio reproduction and more particularly to a stylus construction for use with an electrical transducer having a stylus beam.

As known, the stylus is disposed within the grooves of a phonograph record to make contact with opposite walls of the grooves for transmitting mechanical vibrations from the phonograph record to the transducer through the stylus beam.

While great advances have been made in the quality and performance characteristics of transducers, mountings, stylus beams and turntables, there still exists a need for improving areas of the art. The performance characteristics of every element of the equipment in the art of audio reproduction affects the quality and fidelity of the reproduction. Thus, imperfections in any or all of the separate elements limit the net performance of the audio reproduction system.

Therefore, the present invention is particularly related to the shape of the stylus which is used to make mechanical contact between the transducer carried by the tone arm and the opposite walls of the record groove, as the record and groove rotate about the central axis of the phonograph record or disc.

It is well known that the information contained on the record or disc is transmitted by the variations in the amplitude and frequency of vibrations in the record groove and that these variations vary from point to point along the groove. Consequently, various proposals have been made to improve the shape of the stylus in attempts to minimize tracking distortion. These proposals have been directed to such features as cutting off the tip of a polished conical stylus to prevent or minimize bottoming in the groove. Although a record groove is intended to be V-shaped, the apex or point may not be well defined at the bottom of the groove. Further, dust and other foreign matter can get in the groove and when an extremely fine stylus tip makes contact with either such foreign matter or the bottom of the groove, cracking and popping sounds result.

In addition, in operation, the axis of the stylus can vary relative to the vertical plane passing through the center of the groove due to bounce effect, jar or vibrations imparted to the tone arm or phonograph turntable.

Prior art attempts to obviate the above mentioned disadvantages have also included the variation of the tip portion of a stylus of generally conical configuration by proposing an arrangement of oppositely directed small radii spherical segments at the corners of the tip of a truncated conical body. However, apart from the extreme difficulty in manufacturing such a proposal from hard material, such as diamond, the fact that the radii of curvature of the stylus body increases on progressively increasing radii throughout the remainder of the outwardly and upwardly tapered conical portion presents difficulties in operation. When a stylus of this characteristic tilts transversely in the record groove, the line between the points of contact between opposite walls of the groove is on an angle to the vertical plane bisecting the groove and it is possible to have different radii at the opposite groove wall contacting surfaces of the stylus.

Accordingly the present invention has for an object, to provide an improved stylus construction which obviates one or more of the above recited disadvantages.

It is a particular object of this invention to provide a stylus of a shape which ensures that the stylus surfaces contacting the opposite walls of the record groove have the same radii of curvature regardless of any angular variation between the axis of the stylus tip and a vertical plane bisecting the groove or any variation in the position of the oppositely facing groove wall contacting surfaces occasioned by any turning or twisting movement applied to the body of the stylus in either direction about its vertical axis.

It is a still more particular object of this invention to provide a stylus construction which includes oppositely facing groove wall contacting surfaces having the same extremely small radii extending throughout an upwardly, outwardly tapered length that is at least in excess of that portion of the depth or walls of a phonograph record groove having modulating characteristics.

It is a specific object of this invention to provide a stylus construction for use with a transducer for transposing mechanical variations in the grooves of phonograph records into electrical signs, which comprises a body of hard material, such as diamond, including a mounting portion adapted to be mounted to an electrical transducer and a downwardly and inwardly tapered portion having oppositely facing, spaced, transversely aligned, record groove contacting surfaces, of a length that is in excess of the modulating characteristic of a record groove and which surfaces are defined by an elliptical plane through said portion having the same small minor radii and spaced apart a distance greater than their radii.

A still more specific object of this invention is to provide a tapered stylus tip construction of elliptical outline in any plane transversely positioned to the axis of the stylus with the minor radii of any elliptical outline being the same (the major radius may, if desired, progressively increase), so as to provide oppositely directed edge portions extending upwardly and outwardly from the tip and which edge portions have the same radius of curvature.

Figure 2:
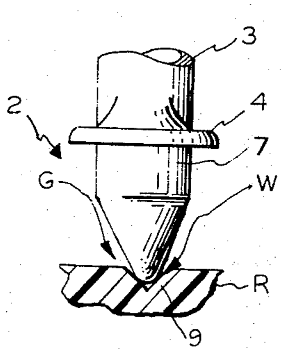
Figure 3:
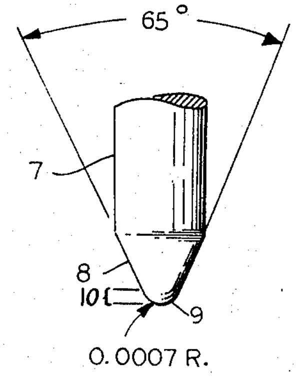
Figure 4:
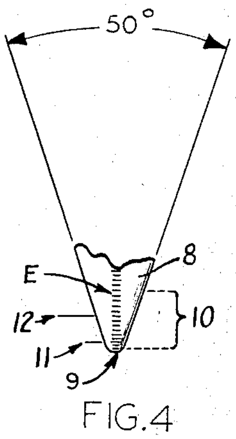
Figure 5:
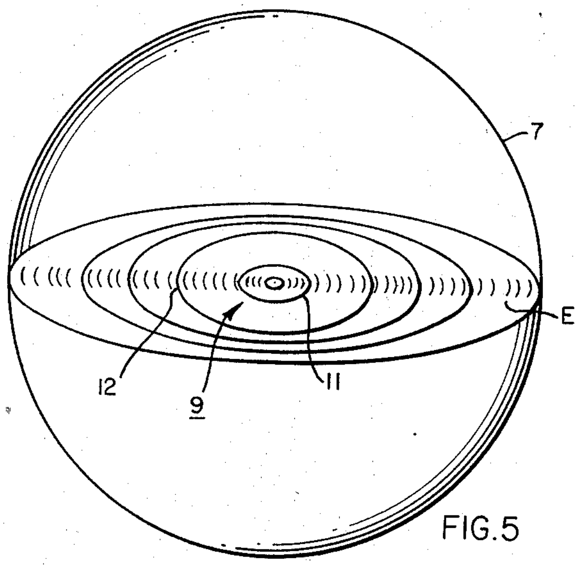

Further and more specific objects of the invention will be apparent from the following description when taken in connection with the accompanying drawings in which:

FIG. 1 is a view in side elevation of a stylus beam illustrating a stylus of the present invention mounted on such beam, FIG. 2 is a view of the stylus beam tip and stylus of the present invention and illustrating the stylus in front elevational view as disposed in a grooved portion of a phonograph record with such portion being shown in cross-section taken in a direction transverse to the groove, FIG. 3 is a front elevational view of the stylus, per se, FIG. 4 is a greatly enlarged side elevational view of the operative portion of the stylus, FIG. 5 is a bottom view of the stylus, per se.

In the drawings, FIG. 1 illustrates a stylus beam assembly 1 including the stylus 2 of the invention and a stylus beam 3. The beam may be made of thin-walled tubing or may comprise any other conventional beam structure and has a flattened or other shaped stylus mounting portion 4 which is shown disposed at an angle to the main body of the beam 3. This flattened or shaped end portion has an opening (not shown) therein adapted to receive the upper portion of the stylus 2 which is mounted within the opening by any conventional way or means, such as by an adhesive material, rivet-shaped bushing, force fitted or other conventional structure. The angular relation of the flattened end portion 4 of the stylus is such as to dispose the same parallel to the surface of a record R. As known, when the stylus beam is mounted on a phonograph pick-up, the other end of the beam, (not shown) is mechanically connected to a transducer, such as a moving coil arrangement, a magnet or the like.

The stylus 2 of the present invention is preferably made of hard material, such as diamond, and includes an upper portion 7 that fits within the opening of the flattened end 4 of the beam and a lower active portion 8 that is shaped according to the invention to fit within and cooperate with the walls W defining the groove G in the record R. This lower portion 8 is of generally tapered configuration in both planes at right angles to one another as shown in FIGS. 3 and 4. However, as distinct from prior art arrangements, the lower portion 8 of the stylus of this invention presents opposed oppositely facing edges E that have a length in excess of the length or depth of the modulating characteristic portions of the walls W and for practical purposes the length of edges E are substantially in excess of the depth of the groove.

The salient feature of this invention resides in construction of these edges E as arcuate, having radii of, for example 0.0002 inch and shaping the active portion 8 as elliptical in any horizontal plane in which the opposite minor radii are a constant 0.0002 inch while the lower edge or tip 9 may be arcuate in front elevation, FIG. 3 with the bottom edge having e.g. a radius of 0.0007 inch. The spacing between the edges E at the normal points of contact of the stylus with the groove is preferably 0.0009 inch (the chord distance) so that the arcuate edges E engage the walls W of the groove at the proper location. The arcuate lower edge 9 is formed from a 0.0009 inch chord of a circle having a radius of 0.0007 inch. This arrangement disposes the tip or edge 9 above the base or apex of the groove.

Accordingly, with the stylus constructed in accordance with the above characteristics, the contact points with the opposite sides or walls of the groove will always be on a surface having a 0.0002 inch radius. This feature minimizes distortion since no matter what tilt or wobble is imparted to the stylus, the contact point radius is the same. This feature presents an improved contact relationship on comparison with known styli that are either fully conical or are generally conical with various shaped extreme tip end portions. In contradistinction to all known styli, the stylus of the present invention presents a distinct 0.0002 inch edge down both sides and across the bottom. Further the included angle between the tangents to the upwardly and outwardly tapered side edges is between 60° and 65° in front elevation, FIG. 3, and the included angle between the tangents to the tapered front and rear surfaces is 50°–55°, FIG. 4. This relationship gives the stylus of the invention a somewhat flattened end appearance.

A compaison of FIGS. 4 and 5 makes it apparent that the cross-sectional shape of the active portion, generally indicated at 10, of stylus 2 defines ellipses of decreasing size but wherein the arcuate edges E of each ellipse along the major diameter of the ellipses at any section along the tapered active portion 10 have identical radii. Thus, in FIG. 5 the ellipse 11 would be found at approximately level 11 in FIG. 4. Similarly ellipse 12 would be located at level 12 and this configuration would continue at least through all ellipses comprising the operative range 10. It will be understood, of course, that the ellipses 11 and 12 will not actually be seen if the stylus is viewed from its lower tip but they are included in FIG. 5 for purposes of correlating this figure to FIG. 4.

What is claimed is:

1. A phonograph stylus for use with a transducer for transposing mechanical variations on the walls of the grooves of a phonograph record into electrical signals comprising a body including an upper mounting portion adapted to be mounted to the transducer and a downwardly and inwardly tapered active portion, wherein the cross-sectional shape of the active portion along the length thereof defines ellipses of decreasing size and wherein the arcuate edges of each ellipse along the major diameter of the ellipses at any section along the tapered active portion have identical radii, said edges being spaced from each other a distance greater than their radii measured between the normal points of contact with a record groove and defining groove-contacting surfaces toward the lower end of said active portion, and said active portion having a length in excess of the depth of the modulating characteristics of the groove.

2. A phonograph stylus as claimed in claim 1 in which said identical radii are shorter than the distance between a normal point of contact and the vertical axis of the body.

3. A phonograph stylus as claimed in claim 2 wherein the extremity of the body adapted to fit within the groove is arcuate having a radius shorter than the length of the chord between the normal points of contact.

References Cited

UNITED STATES PATENTS

| | | | |
|---|---|---|---|
| 1,080,924 | 12/1913 | Owen | 274—38 |
| 3,292,936 | 12/1966 | Grado | 274—38 |

FOREIGN PATENTS

| | | |
|---|---|---|
| 768,414 | 2/1957 | Great Britain. |

HARRY N. HAROIAN, Primary Examiner